United States Patent

Rapoza et al.

[15] 3,706,499
[45] Dec. 19, 1972

[54] BLOOD TEST SYSTEM

[72] Inventors: Edward J. Rapoza, Butler; Maxwell E. Siegel, Sussex, both of N.J.; Weems E. Estelle, Southport, Conn.; Pasquale M. Petrucci, Orange, Conn.; Joseph S. Linarducci, Wilton, Conn.; John Hamma, Milford, Conn.; John Montgomery, Trumbull, Conn.

[73] Assignee: Becton Dickinson and Company, East Rutherford, N.J.

[22] Filed: March 2, 1970

[21] Appl. No.: 15,469

[52] U.S. Cl. .................356/184, 356/190, 356/224, 356/226, 356/227, 324/115
[51] Int. Cl. .................G01j 1/42, G01j 3/48
[58] Field of Search.............356/180, 186, 220, 218; 23/230-292; 324/115

[56] References Cited

UNITED STATES PATENTS

| | | | |
|---|---|---|---|
| 2,048,554 | 7/1936 | Kuder | 356/189 X |
| 3,561,878 | 2/1971 | Kiess | 356/189 X |
| 3,619,776 | 11/1971 | Kinninger | 324/115 |
| 2,657,357 | 10/1953 | Rosso | 324/114 |
| 2,836,793 | 5/1958 | Kelly | 324/115 |
| 2,891,438 | 6/1959 | Fuhrmann et al. | 324/115 X |
| 2,982,174 | 5/1961 | Crandell | 356/224 X |
| 3,441,352 | 4/1969 | Hughes | 324/115 X |

OTHER PUBLICATIONS

"Adapters Increase Meter's Versatility" Electronic Design, June 24, 1959.

Primary Examiner—Ronald L. Wibert
Assistant Examiner—R. J. Webster
Attorney—Kane, Dalsimer, Kane, Sullivan and Kurucz

[57] ABSTRACT

A blood testing system which includes a colorimeter for observing the light transmission characteristics of a reacted blood sample to determine the concentration of a particular component. The colorimeter includes a lamp, a sample holding well, a photocell, and a meter having a needle to indicate the output of the photocell. A removable module is provided which is adapted to plug into the circuitry of the instrument and adjustably calibrate the instrument for a particular blood determination. The module includes a printed scale which is designed to be positioned immediately adjacent the meter needle when the module is operatively connected to the colorimeter, the units of the scale being correlated to the particular blood determination of the module such that the scale reads directly in the units of the test being conducted. By employing a number of modules, each being color-coded and calibrated for a particular blood determination, the colorimeter may be easily adapted to perform a number of tests by merely inserting the appropriate module. A carousel is provided for mounting several modules in the instrument, the carousel being rotatable to sequentially translate individual modules to the operative position adjacent the output needle of the meter. A number of filters are provided for the colorimeter, and a mechanism is incorporated which is designed to selectively position individual filters in the light path of the colorimeter. A patient record card is provided which is adapted to overlie and be temporarily affixed to the module. The card, which may also be color-coded, includes a scale which overlies the scale of the module, this scale being adapted to be marked to serve as a permanent record of the test determination. A removable tear-off tab is associated with the card which may be utilized to identify a blood sample by patient number and test. A number of marked cards, obtained over a period of time for a particular test, is adapted to be placed in overlapping relationship whereby the test results will be displayed as a graph plotted against time. A folder is provided to retain the cards in such overlapping relationship, the folder having a clear plastic overlay with indicia thereon to indicate the normal range of the test results. The cuvette containing the reagent required for the blood determination is provided with a molded plastic cap which is designed to retain a capillary within the cuvette when the cap is attached. For this purpose, the cap includes an integral depending flap having an aperture therethrough, the aperture being designed to threadedly receive the capillary.

7 Claims, 24 Drawing Figures

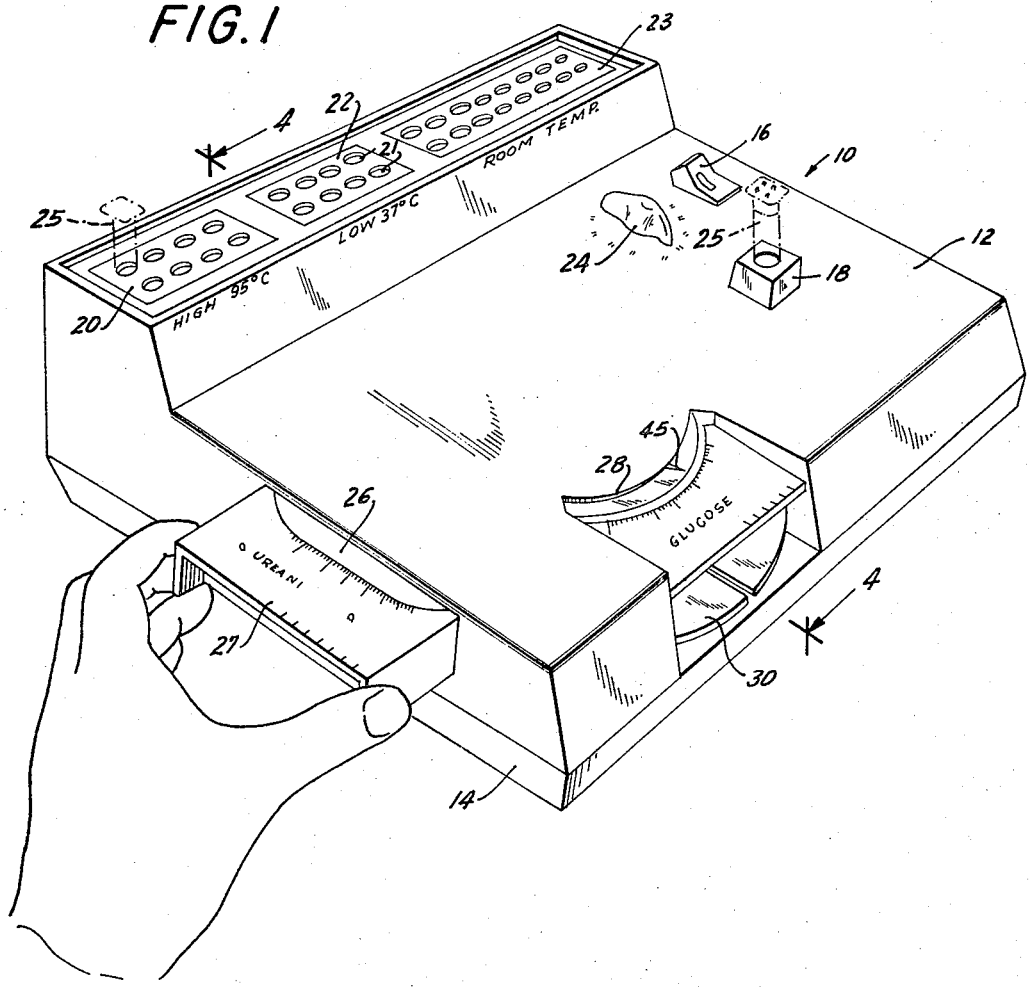
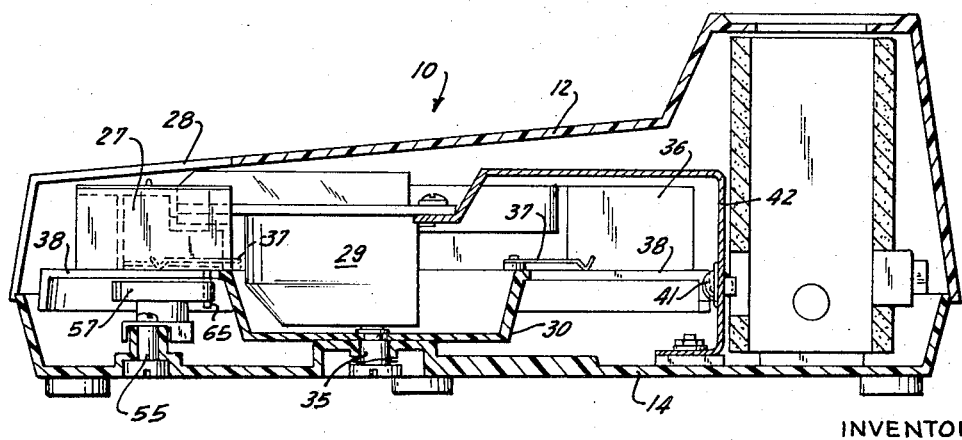

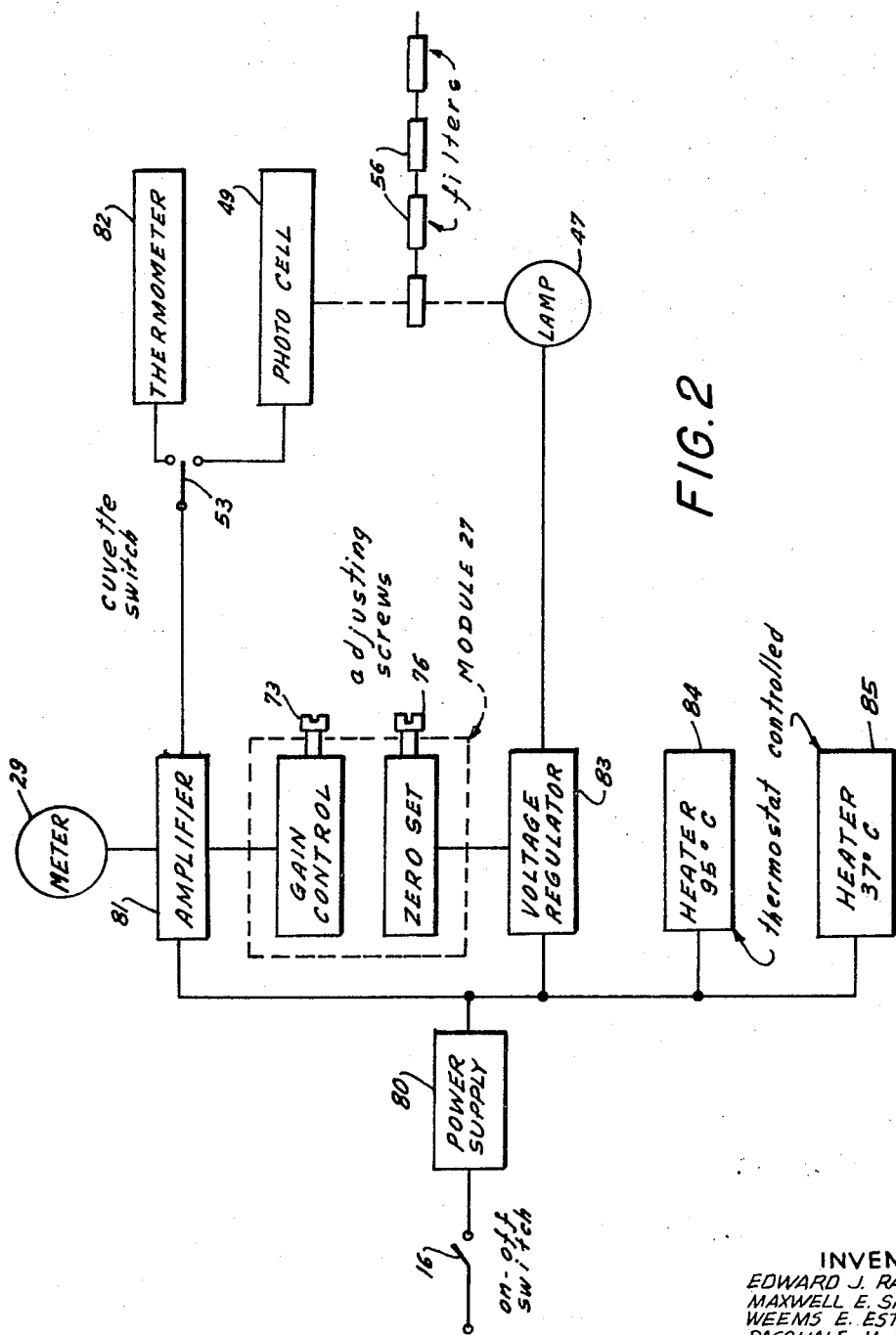

PATENTED DEC 19 1972 3,706,499
SHEET 3 OF 8
FIG.3
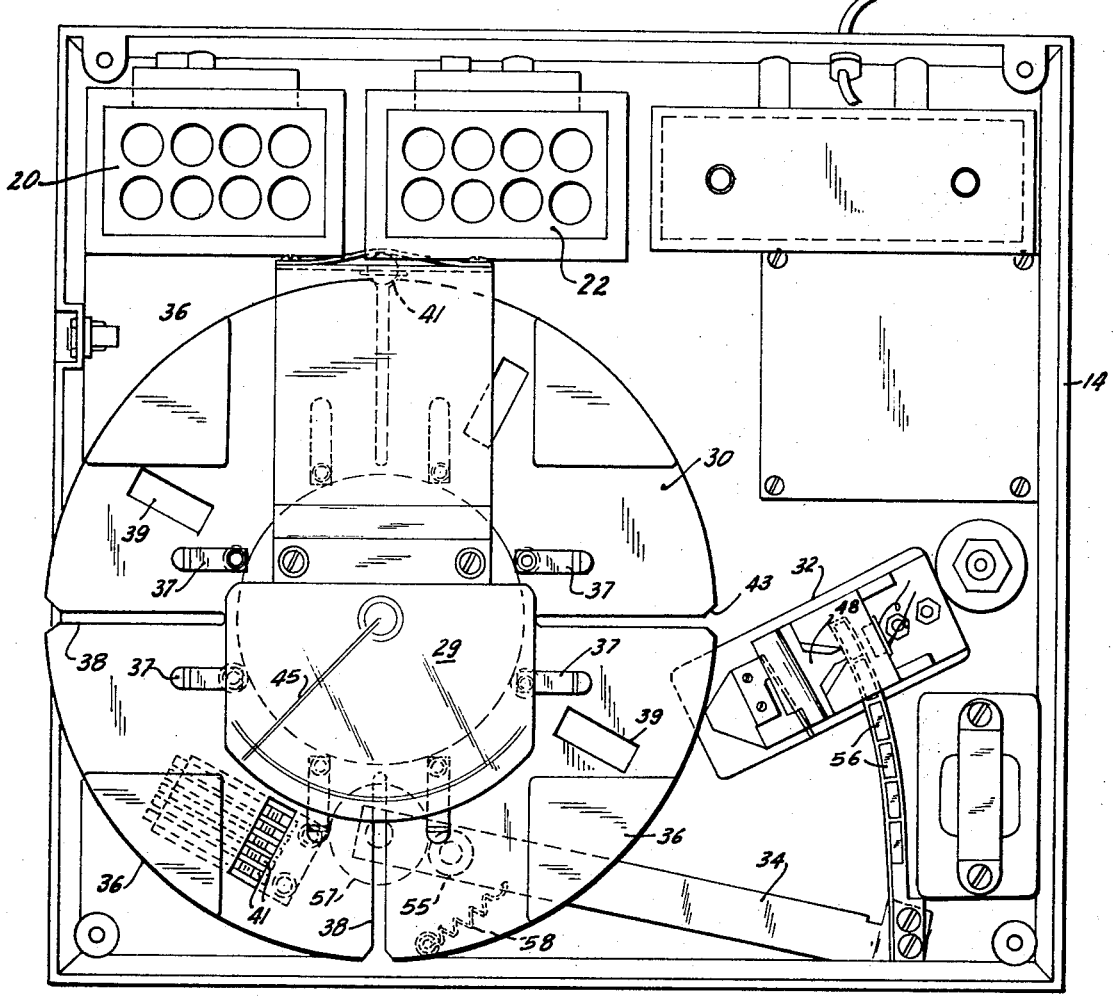
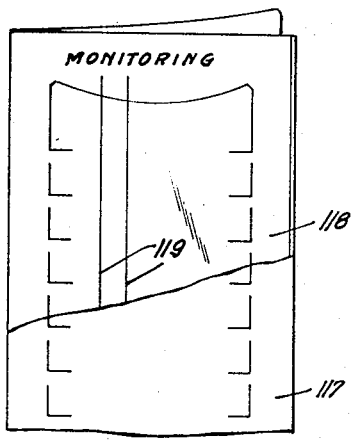
FIG.23
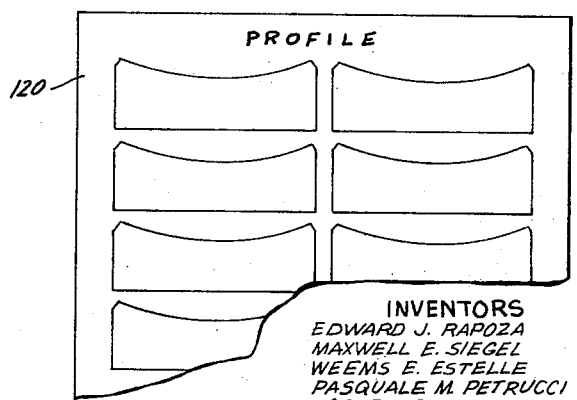
FIG.24
INVENTORS
EDWARD J. RAPOZA
MAXWELL E. SIEGEL
WEEMS E. ESTELLE
PASQUALE M. PETRUCCI
JOSEPH S. LINARDUCCI
JOHN HAMMA
JOHN MONTGOMERY
BY
Kane-Dalsimer Kane-Sullivan Kurucz
ATTORNEYS INVENTORS
EDWARD J. RAPOZA
MAXWELL E. SIEGEL
WEEMS E. ESTELLE
PASQUALE M. PETRUCCI
JOSEPH S. LINARDUCCI
JOHN HAMMA
JOHN MONTGOMERY
BY
ATTORNEYS

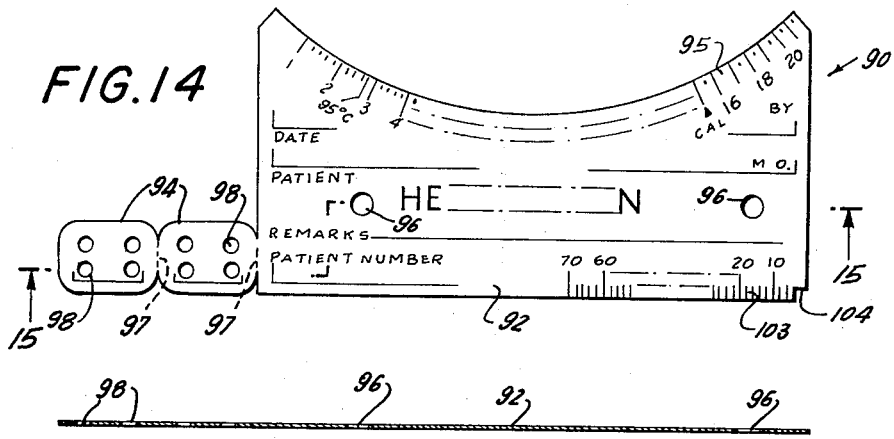
FIG.14
FIG.15
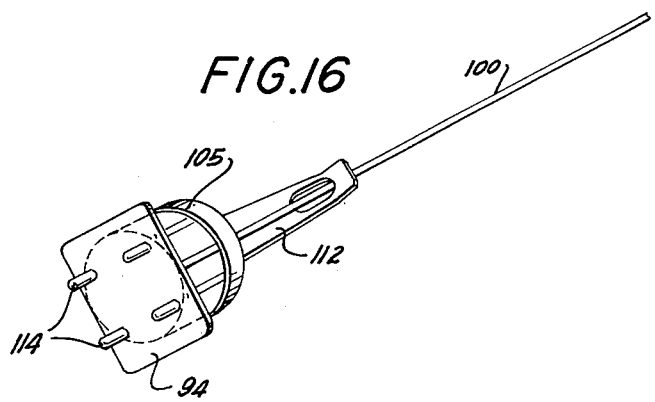
FIG.16
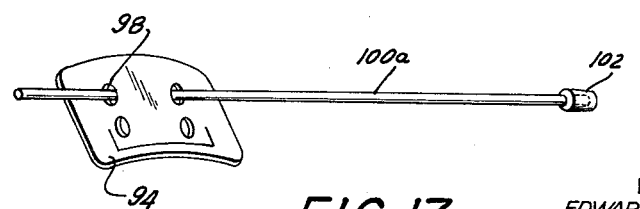
FIG.17
INVENTORS
EDWARD J. RAPOZA
MAXWELL E. SIEGEL
WEEMS E. ESTELLE
PASQUALE M. PETRUCCI
JOSEPH S. LINARDUCCI
JOHN HAMMA
JOHN MONTGOMERY INVENTORS
EDWARD J. RAPOZA
MAXWELL E. SIEGEL
WEEMS E. ESTELLE
PASQUALE M. PETRUCCI
JOSEPH S. LINARDUCCI
JOHN HAMMA
JOHN MONTGOMERY
BY
ATTORNEYS

BLOOD TEST SYSTEM

BACKGROUND AND SUMMARY OF THE INVENTION

The present invention relates to a system for performing colorimetric analysis of fluid samples. More particularly, the invention relates to a colorimetric system useful in determining the components of a blood sample for diagnostic purposes.

It is well known that quantities of important blood components may be determined by measuring the light transmitted through a properly reacted sample. For each determination, the blood sample is reacted into a complex that will show, by its light transmission characteristics, the concentration of the component of interest. Typical of the tests which may be conducted in this manner are determinations for hemoglobin, glucose, cholesterol, urea nitrogen, uric acid, and bilirubin.

Colorimeters of known design comprise as essential elements a lamp, a sample holding well, a photocell, a meter for indicating the output of the photocell, and the associated circuitry. The intensity of the light passing through the sample is monitored by the photocell, which in turn controls the readout of the meter. Since the optical density of the sample varies with the wave length of the light passing through the sample, it is conventional practice to position a filter in front of the photocell such that the wave length which is most sensitive to changes in the optical density of the sample is being monitored.

In the instrument of the present invention, a removable plug-in module shares some of the above functions with the instrument itself. In particular, the meter scale for the readout meter needle is positioned on the module, and part of the meter circuitry is in the module. By this arrangement, both the scale reading and circuitry of a particular module may be used to calibrate the instrument to the requirements of a specific blood determination. By employing a number of modules, each designed to calibrate the instrument for a different blood test, the instrument may be used to quickly and accurately perform any number of different tests. The circuitry in the module includes an adjustable zero set for the meter, and a calibration adjustment for correcting the calibration of the instrument for inherent variations in the chemistry of the reagents employed. Removing a module from the instrument and replacing it will not upset its calibration.

The instrument of this invention further includes a rotary turntable or carousel for conveniently retaining a number of modules in the instrument. When the carousel is turned to swing a module into its operative or meter position, that module's scale (which may be color-coded to the particular test being conducted) aligns itself in front of the instrument's indicating meter. The scale is graduated and numbered for the one specific determination associated with that module, and it reads directly in appropriate units.

In order to provide a permanent record of the determination results, a paper-like patient record card may be removably attached to the upper surface of the module. The card, which may be color-coded along with its associated module to indicate a particular determination, includes a printed scale corresponding to the scale of the module. The test results may thus be marked directly on the card which, when removed, serves as a permanent record.

Since the particular test or determination being conducted will often require that a specific filter be positioned in the light path of the lamp, a mechanism is provided to automatically position the proper filter when the module is rotated in the carousel to its meter position. This mechanism takes the form of a cam pin positioned on the module which is adapted to engage a lever arm. A number of filters are mounted at the opposite end of the lever arm, and movement thereof swings the proper filter into position. Each module has its pin positioned in a pre-selected location such that movement of the lever arm and thus selection of the filter will be automatically correlated to the particular test being conducted.

The instrument of the present invention may further include two incubator blocks together with temperature regulating controls to maintain them at 95° C. and 37° C., respectively, when the instrument is turned on. These incubator blocks are designed to hold the reaction vials or cuvettes while reaction is taking place. A third unheated incubator block may also be provided for room temperature reactions. Since the reaction between the blood component of interest and the reagent for each test is generally permitted for a predetermined time, the instrument may also include a built-in timer.

The removable patient record card incorporates several novel features which are significant aspects of the present invention. The card initially includes tear-off tabs which, together with the card itself, are adapted to be marked with an identifying patient number. These tabs are then attached to any vessel containing the patient's blood sample, the micropipette utilized to transfer the sample in the proper amount and to the cap of the reagent cuvette. As noted above, each card may be color-coded to indicate the particular test for which it is designed. By this arrangement, identification of each blood sample by patient and test is assured.

The patient record card also yields a significant advantage in that it provides a permanent visual record of the test results. In particular, the removable card permits organization of permanent patient records in meaningful graphical displays which aid the physician in his diagnosis. Very often, trends and variations that show up over a period of time mean more than the value of any single blood component determination. If blood tests are made at regular intervals over a period of time, the cards resulting from each test may be arranged in overlaying sequence on a suitable form provided for this purpose. In such arrangement, the marked scales create, virtually, a graph plotted against time with a progression of determination marks which can be scanned at a glance. Thus it is very easy to spot consistencies, sharp variations, or gradual trends. The monitoring form may further include a clear plastic overlay having indicia thereon which are adapted to overlie the marked scales to indicate the normal range of test results.

The use of patient record cards as described herein also permits the assembly of a single graphic display of all the blood chemistry determinations obtained at one time. Presenting all of this information to the physician in a single graphic display may reveal interrelationships which indicate the patient's general physical condition. The use of the removable patient record cards is well suited for this type display since they may be easily mounted in a suitable folder.

A further aspect of the present invention resides in the structure of the cap for the reagent cuvette. The cap is designed to hold the micro-pipette containing the blood sample in the curvette in such a manner that the contents of the micro-pipette may be thoroughly rinsed out and mixed with the reagent in the cuvette. In this regard, it is important that the cap hold the micro-pipette in the upper portion of the cuvette and out of the light path in the colorimeter so that the presence of the micro-pipette will not effect the colorimetric determination. The cap further functions to provide a leak resistant inside-outside seal at the mouth of the cuvette. In addition, the outside portion of the cap includes a number of protuberances which are designed to receive and retain the identifying tear-off tabs of the patient record scale.

Among the more specific objects of the present invention are the following:

1. The provision of a simple and foolproof system for performing a variety of common blood component determinations.

2. The provision of a blood testing system which is self-contained to provide the user with all of the implements necessary to successfully carry out any one of the conventional determinations.

3. The provision of a photometer which includes a zero-set adjustment for the meter and which may be calibrated with a standard reagent.

4. The provision of a removable module which incorporates the electrical components for zero-set and calibration of the meter such that insertion of the module is all that is required to completely calibrate the instrument.

5. The provision of a read-out scale on the module which is correlated to the calibration circuitry of the module such that, by the act of selecting a test module, the proper scale will be positioned adjacent the meter.

6. The provision of a removable paper patient record card having a read-out scale, the scale being adapted to be positioned over the corresponding scale of the module where it may be marked to indicate the meter reading. The scale then serves as a permanent record of the test results.

7. The provision of a number of optical filters for the instrument which are individually selected and positioned in the photometer by the module.

8. The provision of a system for identifying blood samples by patient and test.

9. The provision of a reagent cuvette cap which is able to retain a micro-pipette in coaxial relationship.

The above objects and advantages of the present invention are achieved in the embodiment more particularly described hereinafter. Additional objects and advantages will become apparent to those skilled in the art from the following detailed disclosure.

BRIEF DESCRIPTION OF THE DRAWINGS

FIG. 1 is a perspective view of the instrument of the present invention illustrating the manner in which the removable modules are assembled on the carousel of the instrument.

FIG. 2 is a schematic representation of the circuitry employed in the present invention.

FIG. 3 is an overhead plan view of the instrument, the top cover being removed.

FIG. 4 is a sectional side view taken along the line 4—4 in FIG. 1.

FIG. 14 is a plan view of the patient record element.

FIG. 15 is a side view of the patient record element taken along the line 15—15 of FIG. 14.

FIG. 16 is a perspective view of the cuvette cap showing a retained micro-pipette and the manner in which the tear-off tab of the patient record element may be attached thereto.

FIG. 17 is a perspective view showing the manner in which the tear-off tab may be attached to a micro-pipette.

FIG. 23 is a perspective view of the patient monitoring form and its clear plastic overlay.

FIG. 24 is a plan view of the patient profile form.

DESCRIPTION OF THE PREFERRED EMBODIMENT

Figure 5:
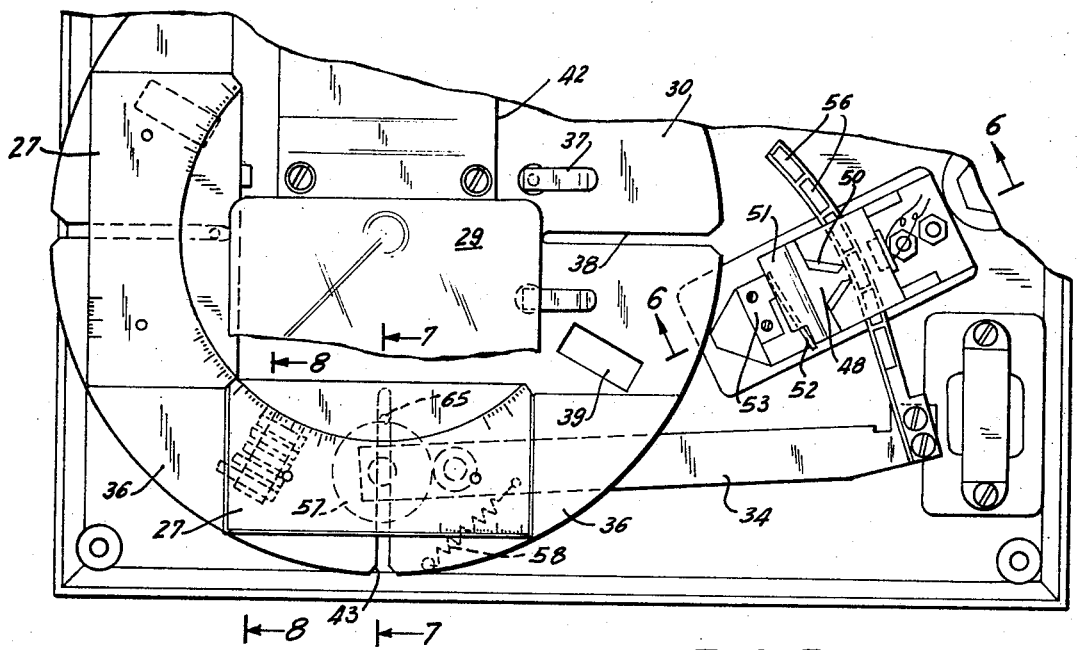
FIG. 5 is a fragmentary view of the instrument as shown in FIG. 3, and illustrating the manner in which the filter lever arm is rotated by the module at the meter read-out position.

The instrument of the present invention is illustrated generally at 10 in the drawings and includes an upper molded plastic cover 12 and a lower molded plastic base 14 which enclose the various components of the device. Viewing FIG. 1, it will be observed that the exterior of the instrument includes an off-on switch 16, a test well guide 18, a 95° C. incubator block 20, a 37° C. incubator block 22, and a room temperature incubator block 23. Each of these incubator blocks includes a number of openings 21 adapted to receive an optically correct reagent vial or cuvette 25. A conventional mechanical timer 24 may be provided as a means for conveniently measuring the reaction times. Any similar timing means such as a conventional electrical timer, may also be effectively utilized. The upper cover 12 of the instrument further includes an entry opening 26 for a removable test module 27, and a meter read-out opening or station 28.

Removal of the upper cover 12 reveals the internal components of the instrument as shown in FIG. 3. These components include as salient features the read-out meter 29, the carousel 30, the photometer 32, and the filter lever arm 34.

The carousel 30, which may be fabricated from any suitable plastic material, generally comprises a circular disc rotatably supported about a central bearing pin 35 (FIG. 4). The upper peripheral surface of the carousel includes four spaced upstanding lugs 36 defining four radially directed module receiving stations therebetween. For the purposes hereinafter described, each module receiving station incorporates a pair of module retaining clips 37, a radial slot 38 through the body of the carousel, and an opening 39 to expose a number of electrical contacts 40. To prevent inadvertent rotation of the carriage, a ball detent arrangement is provided which includes a ball 41 resiliently mounted in the frame member 42. The ball is adapted to enter a tapered entrance 43 at the end of each slot 38 as each module receiving station comes into alignment with the meter 29.

The meter 29 is a conventional milliammeter, and is supported by the frame member 42 to overlie the central portion of the carousel. The meter includes a read-out needle 45 which is adapted to sweep across the lower module receiving (or read-out) station. It will be noted that the meter 29 does not include an attached printed scale.

Figure 6:
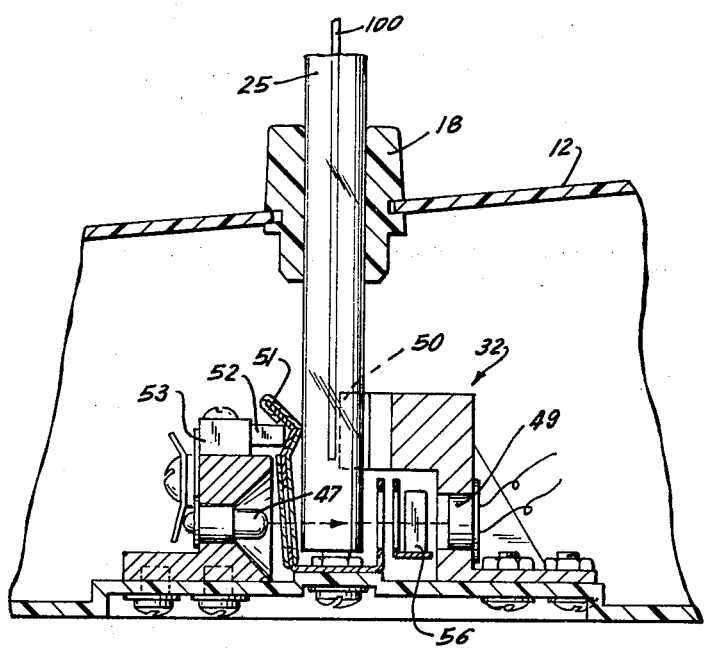
FIG. 6 is a fragmentary sectional view of the photometer taken along the line 6—6 of FIG. 5.

The photometer 32 is illustrated in detail in FIGS. 5 and 6. As essential elements, the photometer includes an electrical lamp 47, a test well 48, and a photocell 49. The well 48 includes a resilient spring arm 51 along one side which is adapted to press the cuvette 25 into a predetermined fixed position against the V-shaped opposite wall 50 when the cuvette is axially inserted. By this arrangement, the cuvette is accurately aligned in the light path between the lamp and photocell. To further facilitate the accurate alignment of the cuvette, the test well guide 18 may be mounted so as to be laterally adjustable on the cover 12, note FIG. 6. As will be further explained, movement of the arm 51 by the entry of the cuvette causes a control arm 52 to actuate an electrical switch 53.

As noted above, it is often desirable that a filter be placed in the light path of the photometer so that a specific wave length is being monitored. Since different tests will require different filters for optimum results, the present invention contemplates a mechanism for automatically positioning a filter in the light path, the particular filter being chosen by the particular module at the read-out position on the carousel. For this purpose, the lever arm 34, which is pivoted for rotation about the pin 55, includes an arcuate row of filters 56 attached at one end. In the illustrated embodiment, the row is shown to include six filters but it will be appreciated that any number could be positioned in the row. As shown in FIGS. 3, 5 and 6, movement of the lever arm causes the filters to sequentially pass into the light path of the photometer. The opposite end of the lever arm includes a circular wheel 57 which is adapted to be engaged by the module in a manner hereinafter described. Also, a spring 58 acts to restrain the lever arm in the position shown in FIG. 3.

The removable test module 27 is illustrated in detail in FIGS. 9–12. The module is fabricated from a suitable plastic material and includes a top cover 60 and a base plate 61. The outer surface of the top cover includes a printed scale 62 positioned along an arcuate edge surface 63, the edge 63 adapted to be positioned immediately below the meter needle 45 when the module is at the read-out position on the carousel. The module further includes a pair of spaced projections 64 on the upper surface, and a depending cam pin 65 on the base plate. Also, the front edge face of the module includes a pair of openings 66, 66' leading to a pair of slots 67, 67' through the base plate 61.

Figure 11:
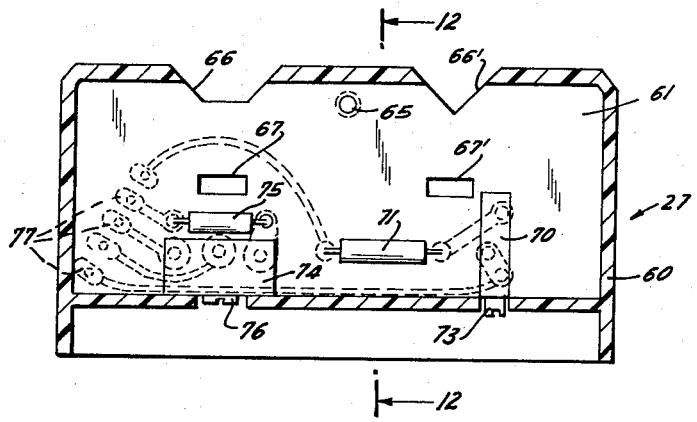
FIG. 11 is a sectional plan view of the module taken along the line 11—11 of FIG. 10.
Figure 12:
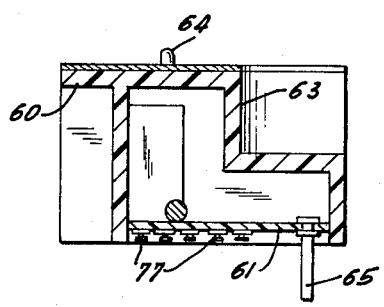
FIG. 12 is a sectional side view of the module taken along the line 12—12 of FIG. 11.
Figure 13:
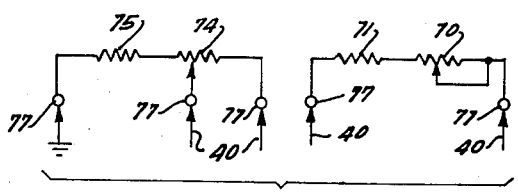
FIG. 13 is a diagram of the circuitry contained in the module.
Figure 18:
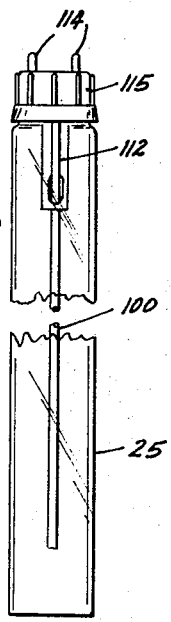
FIG. 18 is a side view of the reagent cuvette, with the open end being closed by a cap holding a micro-pipette inside the cuvette.
Figure 19:
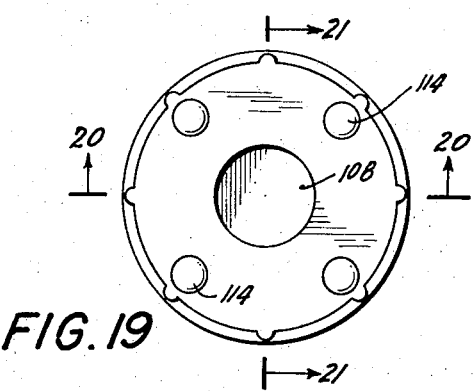
FIG. 19 is a top plan view of the cuvette cap.

As mentioned above, the module itself incorporates a portion of the circuitry of the instrument. Referring to FIGS. 11 and 13, the module includes a calibration adjustment including a variable resistor 70 in series with a fixed resistor 71. The resistor 70 is manually adjustable by rotation of the screw 73 which is accessible through the back edge of the module. A zero-set circuit is also positioned in the module and includes a variable resistor 74 in a series with a fixed resistor 75. The resistor 74 includes a screw adjustment or similar type of adjustment means 76. The leads from these two circuits are connected to the terminals 77 which extend through the base plate of the module.

As will be apparent from FIG. 1, each module is positioned on the carousel by sliding it through the opening 26 in the upper cover 12. As this occurs, the clips 37 enter the module through the openings 66, 66' and lock into the slots 67, 67'. Thus the module is firmly retained in its proper position on the carousel.

Figure 7:
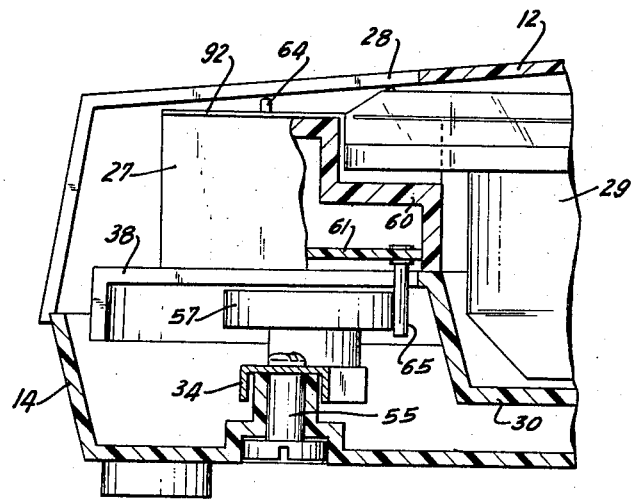
FIG. 7 is a fragmentary sectional view taken along the line 7—7 of FIG. 5 and illustrating the manner in which the module cam pin engages the lever arm.
Figure 8:
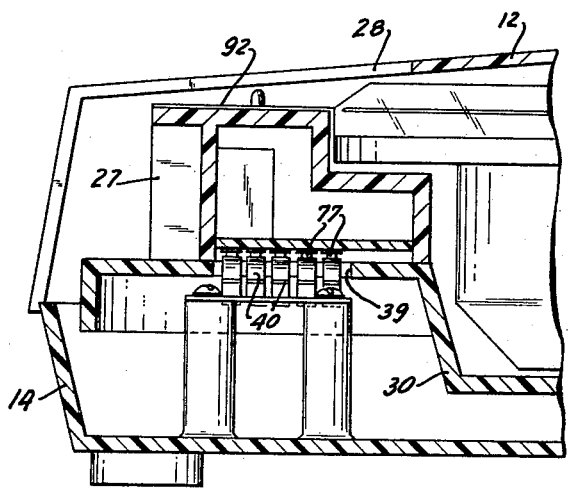
FIG. 8 is a fragmentary sectional view taken along the line 8—8 of FIG. 5 and illustrating the manner in which the module is electrically connected to the instrument.
Figure 9:
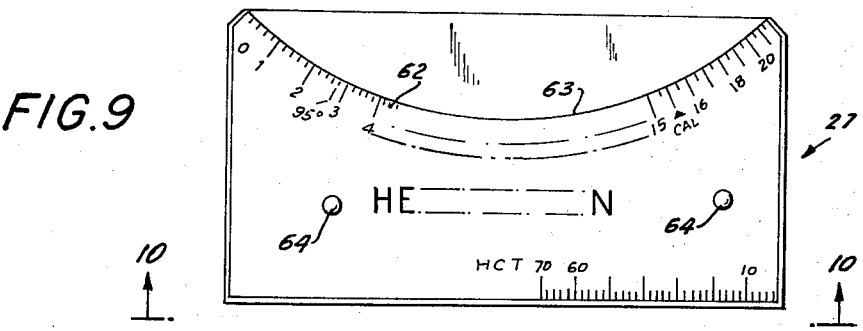
FIG. 9 is a top plan view of the removable module.
Figure 10:
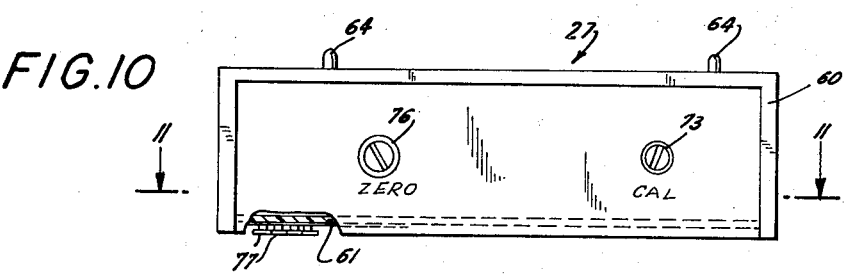
FIG. 10 is a rear elevational view of the module.

When the carousel is manually rotated 90° counter-clockwise, the module which has entered through opening 26 will arrive at the meter read-out station 28. At this position, the resilient electrical contacts 40 in the instrument pass through the opening 39 in the carousel to engage the terminals 77 of the module (see FIG. 8). Thus, the calibration and zero-set circuits of the module are connected to the circuit in the instrument. Concurrently with the rotation of the carousel, the pin 65 on the module engages the wheel 57 of the lever arm 34 (see FIG. 7) to rotate the lever arm until the appropriate filter is in position in the photometer. As will be apparent, the exact placement of the pin 65 in the module base plate determines which filter will be positioned in the photometer. By moving the pin closer to the center of the module, a filter closer to the lever arm will be selected.

The over-all electrical system for the present invention is shown schematically in FIG. 2. It comprises the off-on switch 16 leading from a 110 volt, 60 cycle source to the power supply circuit 80. The power supply circuit feeds the operational amplifier 81, the input of which is controlled by the cuvette actuated switch 53 and is connected to either a thermometer 82 or the photocell 49. As a convenience feature, the thermometer 82 is attached to the 95° C. incubator block. When the thermometer is connected through the switch 53 and amplifier 81 to the meter 29, the meter reading will indicate the temperature of thermometer 82 to thereby serve as a convenient check for the temperature of this incubator. As noted above, the switch 53 is controlled by the entry of the cuvette into the test well, and thus switch-over to the temperature check mode occurs automatically when the cuvette is removed from the well 48. The meter 29 shifts back to determination reading from the photocell 49 as soon as a cuvette is placed in the well.

The power supply circuit 80 also services the voltage regulator 83 which is designed to prevent line fluctuations from varying the intensity of the lamp 47 and thereby degrading determination accuracy. In addition, the power supply circuit feeds the thermostatically controlled heaters 84 and 85 for the two incubators.

As previously mentioned, some of the elements of the circuit are positioned in the removable modules which plug into the instrument. In this regard, the module contains a gain control calibration for the amplifier which serves to scale the meter for the particular test being run. The gain control calibration comprises the resistors 70 and 71 which are connected across the terminals 77 into a feedback loop in the amplifier 81. Also included in the module is the zero set circuit comprising resistors 74 and 75, this circuit establishing the operational point of the voltage regulator and thus serving to control the intensity of light emanating from the lamp 47. Both the calibration and zero set circuits in the module are easily adjusted by rotation of the screws 73 and 76, respectively.

To complete the description of the circuitry shown in FIG. 2 the light emanating from the lamp 47 passes through a filter 56 to the photocell 49. As previously noted, the particular filter employed is automatically selected by the module for the test being conducted. The photocell 49, which serves as the amplifier input when the cuvette is inserted in the test well, measures the intensity of light passing through the sample. The output of the amplifier is calibrated for the particular test being run by the gain control in the module, and thus the meter 29 indicates the test results in appropriate units directly on the module scale 62.

A further aspect of the present invention resides in the use of a removable patient record element 90 as illustrated in FIGS. 14–15. The element 90 is fabricated from a sheet of paper-like material and includes a data card 92 and two detachable tab portions 94. The data card 92 corresponds in outer configuration to the upper face of the module 27 and includes a scale 95 printed adjacent the arcuate upper edge. The card 92 is adapted to overlie and be retained on the upper face of the module 27, and a pair of apertures 96, which are designed to receive the projections 64, are provided for this purpose. When positioned in this manner, the reading of the meter may be marked directly on the scale 95 to make a permanent record of the determination.

It will be understood that each card 92 is printed with the name of the test for which it is designed (e.g., hemoglobin) and that it is adapted for use only with the corresponding module. In this regard, the entire element 90 may be color-coded to correspond with the color of the appropriate module. Also, the spacing of the projections 64 on the module and the apertures 96 on the card are correlated such that the card for a particular determination will fit only the corresponding module.

The tear-off tabs 94, which may also be color-coded, are connected to the card 92 across the incised lines 97. These tabs are adapted to be marked with the name or number of the patient for identification purposes, and are adapted to be attached to both the micro-pipette containing the blood sample and also the reagent cuvette. As will be more fully explained below, a number of apertures 98 are positioned in the tabs for this purpose.

It will be noted in FIG. 14 that the scale 95 (as well as scale 62 on the module) includes a reading marked 95° C. As set forth above, the meter 29 will be operatively connected to the thermometer 82 when the cuvette is removed from the test well. Since the thermometer 82 is attached to the 95° C. incubator, this system provides an automatic temperature check of this incubator during intervals between determinations. The 95° C. mark on the scale corresponds to the meter reading indicative of the proper temperature. It will be apparent that a similar temperature check could be provided for the 37° C. incubator. If not, the 37° C. incubator may be checked with a thermometer in a water filled vial which is placed in one of the openings 21. The scales 95 and 62 also include a calibration setting (marked CAL) for the purposes hereinafter set forth.

There are several conventional methods in which to collect a blood sample from the patient which are applicable for use in this system. For example, a finger puncture may be made and a capillary tube utilized to collect a predetermined amount of whole blood which for most tests would normally be about 72 microliters. Another way to obtain a blood sample would be to make a venipuncture and collect a larger sample in an evacuated container or similar vessel by use of a syringe or similar means. In any event, whether the container be a test tube or a capillary tube it is thereafter centrifuged to separate the whole blood cells from the plasma or serum. It is well known that upon centrifugation, the whole blood cells will be packed into one end of the vessel and the remaining fluid which will be substantially blood plasma will collect in the remaining portion of the container. There will generally be a clear point of demarcation between the blood cells and the plasma.

A micro-pipette is then employed, such as the micro-pipette 100 illustrated in FIG. 17 to collect a predetermined volume of plasma or serum from the centrifuged sample. Micro-pipette 100 is accurately dimensioned and thereby serves both as a precise measuring device (normally 30 microliters when filled) as well as a transfer vessel. If a capillary tube 100a is utilized to collect the initial whole blood sample and requires centrifugation, a cap 102 may be employed to close one end of the capillary tube 100a for centrifugation purposes.

To maintain patient identification, one of the tabs 94 from the patient record element 90 may be positioned on the capillary 100a by threading the micro-pipette through two of the apertures 98.

The patient record element 90 further includes a scale 103 useful in recording the percentage of red blood cells in the sample (i.e., Hematocrit). This procedure is applicable when the original sample is collected from a finger puncture into capillary tube 100a, capped at one end and then centrifuged. The heavier red cells will be positioned at one end of the capillary tube 100a as described above. Thereafter, by positioning the capillary tube 100a in longitudinal alignment with the scale 103, a mark may be made on the scale at the interface between the plasma and packed red cells. This mark then serves as a record of the Hematocrit. To permit accurate placement of the capillary 100a on the scale 103, a cut-out 104 may be provided to receive the cap 102.

The above described procedure is applicable for most tests to which this system is directed. However, there are several tests where this procedure would not be applicable. For example when performing a Hemoglobin test which is performed by this system, a sample of whole blood is transmitted directly to the cuvette. In the Hemoglobin test, there is no necessity for an intermediate centrifugation step to separate the plasma from the blood cells in order to transfer only the plasma to the cuvette. The Hemoglobin test requires that the whole blood sample be transmitted immediately upon collection from the patient to the cuvette for testing. Therefore, a micro-pipette is employed to collect the sample, normally 10 microliters when filled. This 10-microliter pipette is then transferred directly to cap 105 and into the cuvette for testing. No centrifugation step is carried out and the whole blood sample is subject to the Hemoglobin test in the apparatus.

When tests other than the Hemoglobin test are being carried out, and a capillary tube 100a is employed to collect the initial sample and is thereafter capped, centrifuged and the Hematocrit is read, the following steps are then carried out. The tube, which contains approximately 72 micro-liters of centrifuged blood must then be broken so that the red cells can be discarded, and then by utilizing the 30 microliter micro-pipette 100, 30 microliters of plasma is transferred from the remainder of the capillary tube 100a into the 30 microliter micro-pipette. This is accomplished by direct contact between the two volumetric containers.

To assist in the transfer of the measured blood sample in the micro-pipette into the reagent cuvette, a specially designed molded plastic cap 105 is illustrated in FIGS. 16, 18–22 is provided. The cap comprises an outer cylindrical flange 106 having a female thread formation 107 on its internal surface which is adapted to engage a corresponding external thread formation on the open end of the cuvette 25. An inner cylindrical plug 108 is positioned coaxially within the cylinder and is integrally joined thereto by a transverse flange base wall 109. The outer surface of the plug 108 is spaced from the inner surface of the flange 106 to form a cylindrical vial receiving opening therebetween. By design, the outer diameter of the plug is slightly greater than the internal bore diameter of the cuvette such that the plug provides a tight seal when the open end of the cuvette is threaded into the cap. Also, the internal diameter of the flange 106 may be dimensionally controlled to sealingly engage the outer surface of the vial. In this manner, an inside-outside seal is provided.

Figure 20:
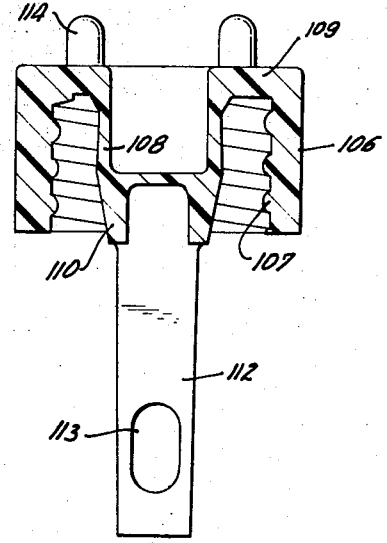
FIG. 20 is a sectional side view of the cuvette cap taken along the line 20—20 of FIG. 19.
Figure 21:
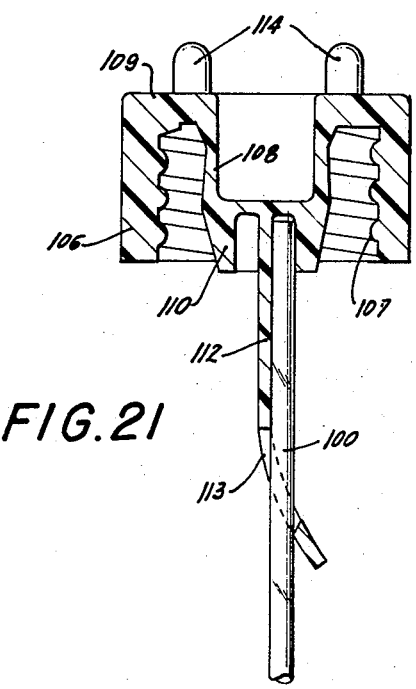
FIG. 21 is a sectional side view taken along the line 21—21 in FIG. 19 and showing the micro-pipette retained thereon.
Figure 22:
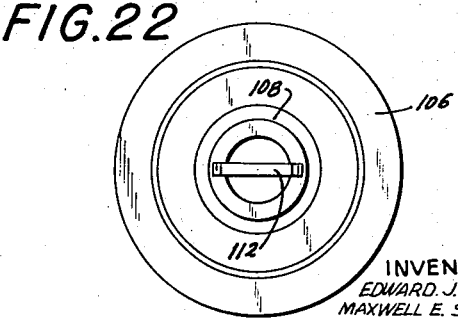
FIG. 22 is a bottom plan view of the cap.

Viewing FIGS. 20 and 21, it will be observed that the plug 108 of the cap is hollow for substantially its entire axial length. In any event, the forward end of the plug terminates in a resilient tubular section 110 which may be slightly tapered to form a conical external surface for facilitating entry of the plug into the cuvette.

An elongated flap 112 is integrally connected to the forward end of the plug 108. In the embodiment illustrated, the flap extends into and substantially bisects the tubular section 110. The remote end of the flap includes an aperture 113. As shown in FIG. 20, the micro-pipette is adapted to be threaded through the aperture 113 and into the tubular section 110 of the plug. By this arrangement, the micro-pipette is conveniently retained in coaxial alignment beneath the cap.

The base wall 109 of the cap further includes a number of protuberances 114 thereon. The number and spacing of the protuberances on the cap are designed to correspond with the apertures 98 in the tear-off tabs 94 of the patient record element 90. Thus as illustrated in FIG. 16, the cap is adapted to mount one of the tabs 94 for identification purposes.

The cap 105 can obviously be fabricated from a wide variety of rubber or plastic materials. For purposes of example, polyethylene has been found to be very satisfactory for this purpose.

The manner in which the patient record cards may be organized into meaningful graphical displays to aid the physician is illustrated in FIGS. 23 and 24. Very often, trends and variations that show up over a period of time are more meaningful than any single blood component determination. As blood sample tests are made at regular intervals, the patient record cards for the component of interest are filled out and marked. When arranged in overlapping sequence on the monitoring form 117, they create a graph of the determinations plotted against time. The progression of determination marks may be scanned at a glance and it will become easy to spot sharp variations or gradual trends. A clear plastic overlay 118 may be used in conjunction with the monitoring form 117. This overlay, which matches the form, is marked at 119 to show the normal range of the particular blood component for which it is designed. This feature enables the physician to work faster in that it gives him speedy assurance as long as the determinations remain within the normal range.

Often, the interrelationships of the various blood component determinations will be indicative of the patient's general physical condition. Presenting all of this information to the physician in a single graphic display enables him to quicken the professional judgment that he must exercise. For this purpose, a profile record form 120 as illustrated in FIG. 24 may be provided. This form is designed to be a graphic filing place for several patient record cards showing different blood determinations made at one time.

In order to facilitate understanding of the present invention, the procedure for obtaining a typical blood determination will be described. As an example, it will be assumed that it is desired to determine the amount of glucose in a particular blood sample. First, the instrument is turned on and a glucose module is positioned at the meter read-out station. To calibrate the instrument, two known reagent samples are required. One of these samples is a zero-setting reagent blank, while the other sample is a standard which will yield light transmission characteristics that match those of a known concentration of the component of interest. When the blank reagent is placed in the test well, the meter indication should be exactly zero. If it is not, it may be corrected by rotating the zero adjustment screw 76 on the module. When the standard reagent sample is placed in the well, the meter indicator should fall on the preprinted calibration mark (CAL) on the scale. Similarly, this reading may be adjusted by rotating the calibration screw 73 on the module. Once the module is calibrated, removing it from the instrument will not upset its calibration. However, since the chemistry of commercial reagents may vary slightly, recalibration is recommended whenever a new supply of reagent is utilized.

For performing the glucose test, a reagent is required which will react with the glucose in the blood sample to form a color which may be monitored by the colorimeter. For purposes of example, a suitable glucose reagent is an orthotoluidine in glacial acetic acid. This reagent reacts to form a blue-green color, the light transmission characteristics of which will indicate the concentration of glucose. A measured amount of the glucose reagent is in the optically correct cuvette 25 having the cap 105. The reagent being employed for a particular test generally is prefilled in the cuvette in a precise amount. All the user is required to do is to utilize the cuvette which has been prepared for the glucose test. At this time, the glucose patient record card is filled out with the patient's name and number, and one of the tabs 94 is placed on the cap 105, utilizing the protuberances 114 on the cap to engage the apertures 98.

A sample of blood is then obtained from the patient in a suitable container such as a capillary tube 100a containing 72 microliters of whole blood collected from a finger puncture. The capillary tube 100a containing 72 microliters of whole blood is then centrifuged to separate the red blood cells from the plasma or serum. If desired at this point, a Hematocrit reading may be taken. Thereafter, the capillary tube 100a is scored and broken in a common well known manner at a point just below the line of demarcation between the red blood cells and the plasma, preferably on the plasma side.

The 30 microliter micro-pipette 100 is then brought in contact with the plasma containing portion of the broken capillary tube 100a and a measured plasma sample of 30 microliters is collected in micro-pipette 100.

The micro-pipette 100 containing the measured plasma sample may be immediately mounted on the cap 105 by threading it through the aperture 113 in the flap 112 and into the tubular section 110, note FIG. 21. In this configuration, the micro-pipette is inserted into the cuvette with the cap closing and sealing the open end thereof, note FIG. 18. To rinse the plasma from the micro-pipette and to mix it with the reagent contained in the cuvette, it is necessary to shake the cuvette up and down vigorously.

To expedite the reaction between the glucose and the reagent, the cuvette 25 is placed in the 95° C. incubator block for 10 minutes. The timer 16 may be utilized to measure the time duration. After this time period has elapsed, the cuvette should be removed from the incubator and placed in a beaker of cool water for 3 or 4 minutes.

With the cuvette still tightly capped, it is wiped dry and placed through the guide 18 and into the test well 48 of the instrument. The patient record card 92 is then positioned on the glucose module which has previously been positioned at the meter read-out position. The glucose determination is marked directly opposite the indicator meter needle. Duplicate patient record cards may be completed at this time if so desired.

From the preceding description, it will be apparent that the present invention provides a completely self-contained blood testing system which is eminently suitable for achieving the above noted objects. While a specific embodiment of the invention has been described in detail herein, it should be understood that the legal scope of the invention is to be determined by the claims only.

We claim:

1. A colorimeter comprising: a supporting structure containing a lamp, a photocell, a sample holding well positioned between said lamp and said photocell, an ammeter for displaying the output of said photocell, an amplifier, and including means to regulate the voltage from the power supply prior to current being provided to the lamp so that essentially a constant amount of current is provided, a removable module having electrical means connectable in said circuit to vary the output gain of said amplifier, whereby said meter may be calibrated for a particular colorimetric determination when said module electrical means is operatively connected in said circuit, said circuit including a feed-back loop in said amplifier, and said module electrical means including a manually adjustable variable resistance element for connection into said feed-back loop for adjusting and setting the output gain of the amplifier in order to calibrate the colorimeter so that, when said module is removed and replaced by a further module, only the variable resistance element in the further module need be adjusted and set to calibrate the output gain of the amplifier in order to calibrate the colorimeter so that said calibration remains the same for a reasonable length of time upon removal thereof from the remainder of the colorimeter and later returned thereto.

2. The invention in accordance with claim 1 wherein said removable module further includes electrical means connectable in said circuit to adjustably regulate the flow of current to said lamp.

3. The invention in accordance with claim 2 wherein said ammeter includes a needle indicating the flow of current therethrough, and said module including a printed scale for positioning adjacent said needle when said module electrical means is operatively connected in said circuit, said scale being correlated with said ammeter to read directly in the units of said particular colorimetric determination.

4. The invention in accordance with claim 3 wherein a plurality of filters are positioned on one end of a lever arm, said lever arm being rotatable to selectively position an individual filter between said lamp and said photocell.

5. The invention in accordance with claim 4 wherein said module further includes a cam for engaging the opposite end of said lever arm when said module electrical means is operatively connected in said electrical circuit, the position of said cam on said module being predetermined whereby a preselected filter is positioned between said lamp and said photocell.

6. The invention in accordance with claim 1 wherein a rotatable carousel is positioned on the supporting structure and having a plurality of radially disposed module receiving stations thereon, said carousel being rotatable whereby each module receiving station may be selectively rotated into a meter read-out position.

7. The invention in accordance with claim 6 wherein terminal means are provided to operatively connect said module electrical means in said electrical circuit when said module is positioned in said meter read-out position.

* * * * *